UNITED STATES PATENT OFFICE.

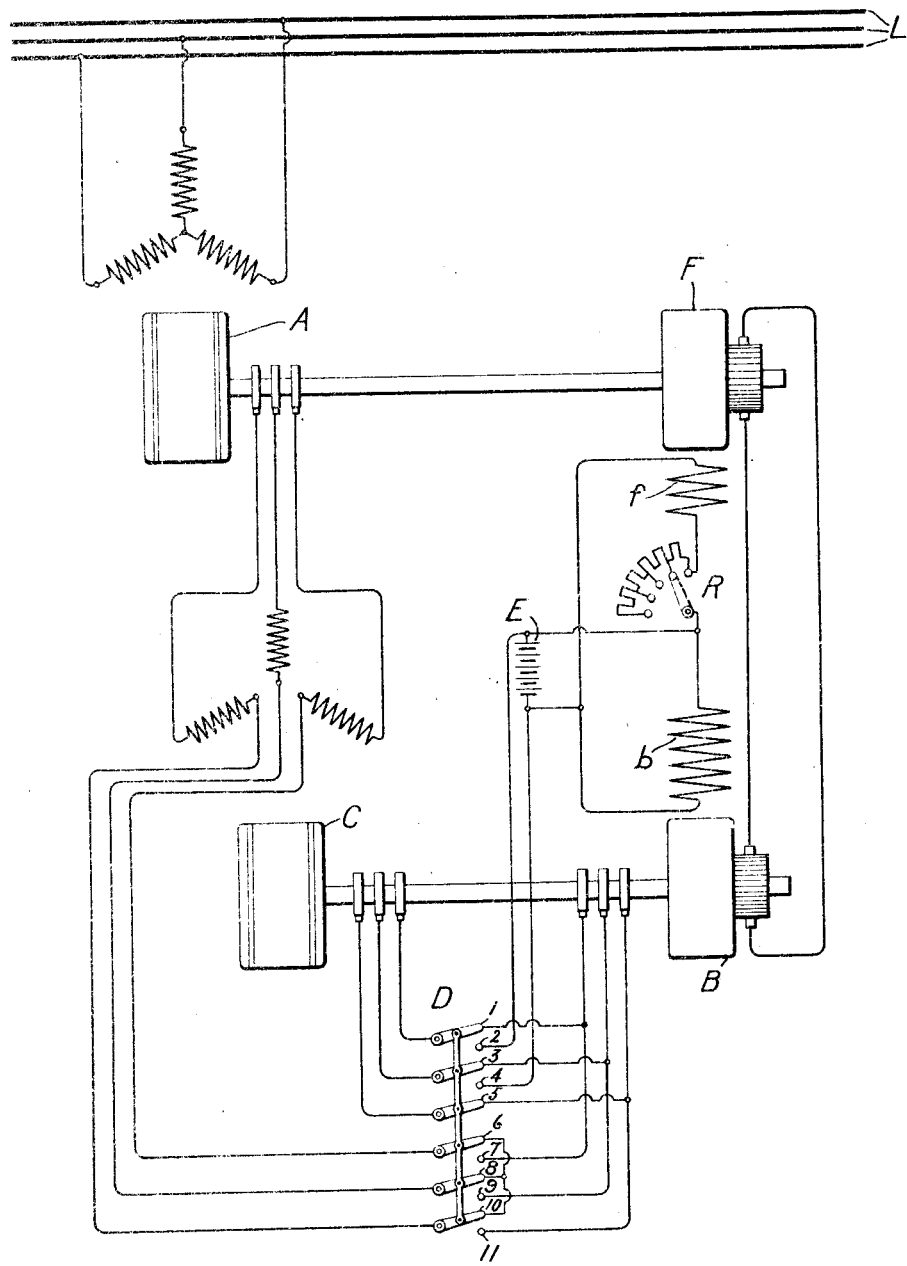

LIONEL FLEISCHMANN, OF BERLIN, GERMANY, ASSIGNOR TO GENERAL ELECTRIC COMPANY, A CORPORATION OF NEW YORK.

SYSTEM OF MOTOR CONTROL.

1,102,488.  Specification of Letters Patent.  Patented July 7, 1914.

Application filed May 3, 1912.  Serial No. 694,830.

*To all whom it may concern:*

Be it known that I, LIONEL FLEISCHMANN, a citizen of the United States, residing at Berlin, Germany, have invented certain new and useful Improvements in Systems of Motor Control, of which the following is a specification.

My invention relates to a system of control of electric motors and more particularly to a system of speed control of induction motors in which the energy taken from the secondary thereof is transformed by means of a rotary transformer into direct current electrical energy or into electrical energy of a different frequency and is utilized in any well known manner. In such motor control systems, it is often desirable to vary the speed of the induction motor, and consequently the slip of the motor over a wide range. In order to vary the speed of the induction motor it has heretofore been necessary to construct the rotary transformer so that it is capable of a great range of regulation, because the rotary transformer has been connected directly to the secondary of the induction motor and consequently its speed varies with the frequency of the slip currents of the induction motor.

My invention has for its object to provide such a system of control for an induction motor in which the rotary transformer may be of simple construction and need not be capable of such a great range of regulation.

To this end, one feature of my invention consists in providing, in such a system of induction motor control, a dynamo electric machine connected in cascade between the rotary transformer and the induction motor, the speed of which is to be controlled.

Another feature of my invention consists in utilizing the dynamo electric machine as an alternating current booster when it no longer forms a part of the system of speed control of the induction motor. Preferably the dynamo electric machine is connected in cascade between the rotary transformer and the induction motor for operation of the induction motor at a slow speed and as an alternating current booster between the induction motor and the rotary transformer for operation of the induction motor at a higher speed. Throughout the specification and claims, I mean by a rotary transformer, a dynamo electric machine or motor-generator set which transforms electrical energy from one frequency to another or to direct current.

Other features of novelty which characterize my invention will be pointed out with particularity in the claims annexed to and forming a part of this specification.

My invention will best be understood by reference to the following description taken in connection with the accompanying drawing, in which the single figure shows diagrammatically a system arranged in accordance with my invention.

Referring to the drawing, A is an induction motor, the speed of which is to be controlled and which is supplied with alternating current from an alternating current source, as the lines L. B is a rotary transformer of any suitable type for transforming alternating current electrical energy from one frequency to another, or to direct current. In the particular system which I have chosen to illustrate, I have shown the rotary transformer as a rotary converter. Energy taken from the secondary of the induction motor A is transformed by the rotary transformer B and is utilized in any well known manner.

C is a dynamo electric machine which is preferably mechanically connected to the rotary transformer B. The dynamo electric machine C is connected in cascade as a frequency changer between the rotary transformer B and the induction motor A by means of a switch D when the induction motor A is operating at one speed, preferably a low speed, or, in other words, at a high slip, in which case the frequency and the voltage of the rotor or secondary currents of the induction motor A are comparatively high, and the rotary transformer B is connected as a simple rotary transformer by the switch D when the motor A is operating at a different speed, preferably a higher speed, in which case the frequency and voltage of the rotor currents thereof are smaller. In the preferred form of my invention, I utilize the dynamo electric machine C as an alternating current booster for the rotary transformer when the motor A is operating at a high speed. In order to operate the dynamo electric machine C as an alternating current booster, I supply its rotor or stator with direct current from a suitable source. I have chosen to show this source of direct current as a storage battery E, which may be, however, any suitable source of direct current.

In the drawings I have shown my invention applied to the particular system of the British Patent No. 25,147 of 1905, in which an auxiliary dynamo electric machine F, which is preferably a direct current machine, is mechanically connected to the rotor of the induction motor A and is supplied with current from the rotary transformer B.

The operation of this system is as follows: It is well known that a transformation of energy takes place in the rotor or secondary of a loaded induction motor. When the induction motor A is operating at a low speed, the switch D is in the position shown in the drawing, making contact with contacts 1, 3, 5, 6, 8 and 10, in which case the energy flowing out of the secondary of the motor A is taken into the stator of the dynamo electric machine C which is connected in Y, since the contacts 6, 8 and 10, engaged by the switch D, are short-circuited. The rotor windings of the machine C are connected to the rotary transformer B. Since the windings of the machine C are connected as just explained, this machine is connected in cascade between the rotary transformer B and the induction motor A. The rotary transformer B transforms the energy from the secondary of the machine C into direct current, which is then supplied to the direct current machine F. The rotary transformer B is shown as being excited by a field winding $b$ which is supplied with constant excitation from the battery E and the direct current machine F is shown as being excited by a field winding $f$ connected to the storage battery E in series with a rheostat R. The speed of the induction motor A may be varied by varying the excitation of the field winding $f$. In order to change the speed of the motor A, the field of the motor F is changed. For example, by increasing the amount of resistance in series with the field winding $f$, the motor F will thus tend to increase the speed of the induction motor A, because by weakening the field of the motor F, it will take more current from the rotary transformer B so that the secondary of the induction motor A will supply more current to the rotary converter through the dynamo electric machine C, and consequently the induction motor A will develop a greater torque which will tend to increase its speed. The motor F will also tend to increase the speed of the induction motor because its counter-electromotive force is reduced, because of its weakened field. It will therefore be seen that by adjusting the rheostat R, any required speed of the induction motor can be obtained. The electrical energy converted in the rotor of the induction motor A is utilized by passing it through the machine C, the rotary converter B and the direct current machine F, and is returned to the source through the shaft of the motor A in the form of mechanical energy. If, therefore, the energy output of the direct current circuit be kept constant, the output of the induction motor will also be kept constant. Since with the switch D in the position described above, the dynamo electric machine C is connected in cascade between the rotary transformer B and the induction motor A, the machines B and C operate at a speed which is equal to twice the frequency of the secondary current of the induction motor A divided by the sum of the number of their poles. If now the speed of the induction motor A has been increased so that the frequency of the secondary currents is small, the switch D is operated to make contact with contacts 2, 4, 7, 9 and 11. When the switch is in this position, the dynamo electric machine C no longer forms a part of the system of speed control of the induction motor A, but I prefer to use it as an alternating current booster in series with the rotary transformer B. As will be seen from the drawing, the stator windings are connected in series between the collector rings of the rotary transformer B and the collector rings of the induction motor A. The source of direct current E is connected to two of the collector rings of the rotor winding of dynamo electric machine C and supplies direct current to the rotor winding. By suitably choosing the voltage of the excitation supplied to the rotor of the dynamo electric machine C, or by regulating it, the voltage supplied to the rotary transformer B and, therefore, the direct current voltage supplied to the motor F may be made such, that the armature voltage of the machine F with the same range of regulation of the speed of the motor A, varies within small limits, whereby the machine F may be made smaller. With the switch in this position, the rotary transformer B is connected as a simple rotary transformer and will operate at a speed equal to twice the frequency of the secondary current of the induction motor A divided by the number of poles of the transformer B.

When the dynamo electric machine C is connected in cascade between the rotary transformer B and the induction motor A, the speed of the rotary transformer varies with the slip of the induction motor A divided by the sum of the number of poles of the machines B and C, and when connected as a simple rotary transformer its speed varies with the slip divided only by the number of poles of the machine B. It will therefore be seen that it is possible, by connecting the dynamo electric machine C in cascade between the rotary transformer B and the motor A or by connecting the rotary transformer as a simple rotary transformer, to vary the speed of the induction motor over a great range while the speed of the rotary transformer is varied over a much smaller range. For example, when the induction motor is operating with a large slip the machine C is connected in cascade between the rotary transformer and the motor A and consequently the rotary transformer (assuming the number of its poles equals the number of poles on the machine C) is operating at a speed of only one-half of what it would be operating if it were connected as a simple rotary transformer, and when the induction motor is operating with a small slip, the rotary transformer B is connected as a simple rotary transformer. If desired, the field of the machine F may be regulated automatically, as for example, as described in the British Patent No. 25,147 of 1905.

I desire it to be understood that my invention is not limited to the particular system shown and described, and I aim in the appended claims to cover all modifications which do not depart from the spirit and scope of my invention.

What I claim as new and desire to secure by Letters Patent of the United States, is:—

1. In a system of motor control, an induction motor, and means for regulating the speed of said induction motor by utilizing energy taken from the secondary of the induction motor comprising a rotary transformer, a dynamo electric machine, and means for connecting said dynamo electric machine in cascade between said rotary transformer and said induction motor for operation of said induction motor at one speed and for connecting said rotary transformer as a simple rotary transformer for operation of said induction motor at a different speed.

2. In a system of motor control, an induction motor, and means for regulating the speed of said induction motor by utilizing energy taken from the secondary of the induction motor comprising a rotary transformer, a dynamo electric machine, and means for connecting said dynamo electric machine in cascade between said rotary transformer and said induction motor for operation of said induction motor at a low speed and for connecting said rotary transformer as a simple rotary transformer for operation of said induction motor at a high speed.

3. In a system of motor control, an induction motor, and means for regulating the speed of said induction motor by utilizing energy taken from the secondary of said induction motor comprising a rotary transformer, a dynamo electric machine, and means for connecting the dynamo electric machine in cascade or as an alternating current booster between said rotary transformer and said induction motor.

4. In a system of motor control, an induction motor, and means for regulating the speed of said induction motor by utilizing energy taken from the secondary of the induction motor comprising a rotary transformer, a dynamo electric machine, and means for connecting said dynamo electric machine in cascade between said induction motor and said rotary transformer for operation of said induction motor at a low speed and for connecting said dynamo electric machine as an alternating current booster in series with said rotary transformer for operation of said induction motor at a high speed.

5. In a system of motor control, an induction motor, means for regulating the speed of said induction motor by utilizing energy taken from the secondary of the induction motor comprising a rotary transformer for transforming alternating current into direct current, a direct current machine mechanically connected to said induction motor and supplied with current from said rotary transformer, a dynamo electric machine, and means for connecting said dynamo electric machine in cascade between said rotary transformer and said induction motor for operation of said induction motor at one speed and for connecting said rotary transformer as a simple rotary transformer for operation of said induction motor at a different speed.

6. In a system of motor control, an induction motor, means for regulating the speed of said induction motor by utilizing energy taken from the secondary of the induction motor comprising a rotary transformer for transforming alternating current into direct current, a direct current machine mechanically connected to said induction motor and supplied with current from said rotary transformer, a dynamo electric machine, and means for connecting said dynamo electric machine in cascade between said rotary transformer and said induction motor for operation of said induction motor at a low speed and for connecting said rotary transformer as a simple rotary transformer for operation of said induction motor at a high speed.

7. In a system of motor control, an induction motor, means for regulating the speed of said induction motor by utilizing energy taken from the secondary of the induction motor comprising a rotary transformer for transforming alternating current into direct current, a direct current machine mechanically connected to said induction motor and supplied with current from said rotary transformer, a dynamo electric machine, and means for connecting said dynamo electric machine in cascade as a frequency changer or as an alternating current booster between said rotary transformer and said induction motor.

8. In a system of motor control, an induction motor, means for regulating the speed of said induction motor by utilizing energy taken from the secondary of the induction motor comprising a rotary transformer for transforming alternating current into direct current, a direct current machine mechanically connected to said induction motor and supplied with current from said rotary transformer, a dynamo electric machine, and means for connecting said dynamo electric machine in cascade as a frequency changer between said induction motor and said rotary transformer for operation of said induction motor at a slow speed and for connecting said dynamo electric machine as an alternating current booster in series with said rotary transformer for operation of said induction motor at a high speed.

9. In a system of motor control, an induction motor, means for regulating the speed of said induction motor by utilizing energy taken from the secondary of the induction motor comprising a rotary transformer, a dynamo electric machine having a stator winding and a rotor winding provided with collector rings, a source of direct current, and means for connecting said dynamo electric machine in cascade between said rotary transformer and said induction motor for operation of said induction motor at one speed and for connecting said source of direct current to the collector rings of said rotor winding and said stator winding in series with said rotary transformer, whereby said dynamo electric machine operates as an alternating current booster, for operation of said induction motor at a different speed.

10. In a system of motor control, an induction motor, means for regulating the speed of said induction motor by utilizing energy taken from the secondary of the induction motor comprising a rotary transformer, a dynamo electric machine having a stator winding and a rotor winding provided with collector rings, a source of direct current, and means for connecting said dynamo electric machine in cascade between said rotary transformer and said induction motor for operation of said induction motor at a low speed, and for connecting said source of direct current to the collector rings of said rotor winding and said stator winding in series with said rotary transformer, whereby said dynamo electric machine operates as an alternating current booster, for operation of said induction motor at a high speed.

11. In a system of motor control, an induction motor, means for regulating the speed of said induction motor by utilizing energy taken from the secondary of the induction motor comprising a rotary transformer for transforming alternating current to direct current, a direct current machine mechanically connected to said induction motor and supplied with current from said rotary transformer, a dynamo electric machine having a stator winding and a rotor winding provided with collector rings, a source of direct current, and means for connecting said dynamo electric machine in cascade between said rotary transformer and said induction motor for operation of said induction motor at one speed and for connecting said source of direct current to the collector rings of said rotor winding and said stator winding in series with said rotary transformer, whereby said dynamo electric machine operates as an alternating current booster, for operation of said induction motor at a different speed.

12. In a system of motor control, an induction motor, means for regulating the speed of said induction motor by utilizing energy taken from the secondary of the induction motor comprising a rotary transformer for transforming alternating current to direct current, a direct current machine mechanically connected to said induction motor and supplied with current from said rotary transformer, a dynamo electric machine having a stator winding and a rotor winding provided with collector rings, a source of direct current, and means for connecting said dynamo electric machine in cascade between said rotary transformer and said induction motor for operation of said induction motor at a low speed and for connecting said source of direct current to the collector rings of said rotor winding and said stator winding in series with said rotary transformer, whereby said dynamo electric machine operates as an alternating current booster, for operation of said induction motor at a high speed.

13. In a system of motor control, an induction motor, means for regulating the speed of said induction motor by utilizing energy taken from the secondary of the induction motor comprising a rotary transformer, a dynamo electric machine mechanically connected to said induction motor and supplied with current from said rotary transformer, a second dynamo electric machine, and means for connecting said second dynamo electric machine in cascade between said rotary transformer and said induction motor for operation of said induction motor at one speed and for connecting said rotary transformer as a simple rotary transformer for operation of said induction motor at a different speed.

14. In a system of motor control, an induction motor, means for regulating the speed of said induction motor by utilizing energy taken from the secondary of the induction motor comprising a rotary transformer, a dynamo electric machine mechanically connected to said induction motor and supplied with current from said rotary transformer, a second dynamo electric machine, and means for connecting said second dynamo electric machine in cascade between said rotary transformer and said induction motor for operation of said induction motor at low speed and for connecting said rotary transformer as a simple rotary transformer for operation of said induction motor at a high speed.

15. In a system of motor control, an induction motor, means for regulating the speed of said induction motor by utilizing energy taken from the secondary of the induction motor comprising a rotary transformer, a dynamo electric machine mechanically connected to said induction motor and supplied with current from said rotary transformer, a second dynamo electric machine, and means for connecting said second dynamo electric machine either in cascade as a frequency changer or as an alternating current booster between said rotary transformer and said induction motor.

16. In a system of motor control, an induction motor, means for regulating the speed of said induction motor by utilizing energy taken from the secondary of the induction motor comprising a rotary transformer, a dynamo electric machine mechanically connected to said induction motor and supplied with current from said rotary transformer, a second dynamo electric machine, and means for connecting said second dynamo electric machine in cascade as a frequency changer between said rotary transformer and said induction motor for operation of said induction motor at a slow speed and for connecting said second dynamo electric machine as an alternating current booster in series with said rotary transformer for operation of said induction motor at a high speed.

17. In a system of motor control, an induction motor, means for regulating the speed of said induction motor by utilizing energy taken from the secondary of the induction motor comprising a rotary transformer, a dynamo electric machine mechanically connected to said induction motor and supplied with current from said rotary transformer, a second dynamo electric machine having a stator winding and a rotor winding provided with collector rings, a source of direct current, and means for connecting said second dynamo electric machine in cascade between said rotary transformer and said induction motor for operation of said motor at one speed and for connecting said source of direct current to the collector rings of said rotor winding and said stator winding in series with said rotary transformer, whereby said second dynamo electric machine operates as an alternating current booster, for operation of said induction motor at a different speed.

18. In a system of motor control, an induction motor, means for regulating the speed of said induction motor by utilizing energy taken from the secondary of the induction motor comprising a rotary transformer, a dynamo electric machine mechanically connected to said induction motor and supplied with current from said rotary transformer, a second dynamo electric machine having a stator winding and a rotor winding provided with collector rings, a source of direct current, and means for connecting said second dynamo electric machine in cascade between said rotary transformer and said induction motor for operation of said induction motor at a low speed and for connecting said source of direct current to the collector rings of said rotor winding and said stator winding in series with said rotary transformer, whereby said second dynamo electric machine operates as an alternating current booster, for operation of said induction motor at a high speed.

In witness whereof, I have hereunto set my hand this 11th day of April 1912.

LIONEL FLEISCHMANN.

Witnesses:
RICHARD NEUMANN,
CRISTIANINO SARTI.